US009290045B2

(12) United States Patent
Cron et al.

(10) Patent No.: US 9,290,045 B2
(45) Date of Patent: Mar. 22, 2016

(54) SPOKE FOR A TIRE WITH OPTIMIZED THICKNESS FOR IMPROVED DURABILITY

(71) Applicants: Compagnie Generale des Etablissements Michelin, Clermont-Ferrand (FR); Michelin Recherche et Technique S.A., Granges-Paccot (CH)

(72) Inventors: Steven M Cron, Simpsonville, SC (US); Timothy Brett Rhyne, Greenville, SC (US)

(73) Assignees: Compagnie Generale des Etablissements Michelin, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 8 days.

(21) Appl. No.: 14/390,432

(22) PCT Filed: Apr. 3, 2013

(86) PCT No.: PCT/US2013/035064
§ 371 (c)(1),
(2) Date: Oct. 3, 2014

(87) PCT Pub. No.: WO2013/152067
PCT Pub. Date: Oct. 10, 2013

(65) Prior Publication Data
US 2015/0174953 A1 Jun. 25, 2015

Related U.S. Application Data

(60) Provisional application No. 61/620,687, filed on Apr. 5, 2012.

(51) Int. Cl.
*B60C 7/10* (2006.01)
*B60B 9/04* (2006.01)
*B60B 9/26* (2006.01)

(52) U.S. Cl.
CPC ............... *B60B 9/26* (2013.01); *B60B 2900/30* (2013.01); *B60B 2900/321* (2013.01); *B60B 2900/325* (2013.01)

(58) Field of Classification Search
CPC ............ B60C 7/10; B60C 7/12; B60C 7/125; B60C 7/14; B60B 9/04; B60B 9/26
See application file for complete search history.

(56) References Cited

U.S. PATENT DOCUMENTS

| 1,438,604 A | * | 12/1922 | McClure | B60C 7/12 152/282 |
| 3,219,090 A | * | 11/1965 | Cislo | B21C 47/34 152/7 |
| 8,019,502 B2 | * | 9/2011 | Brusarosco | B60C 23/064 340/443 |

FOREIGN PATENT DOCUMENTS

| JP | 20126560 A | 1/2012 |
| WO | 2012030519 A2 | 3/2012 |

OTHER PUBLICATIONS

International Search Report with Written Opinion, dated Jul. 27, 2013.
Bridgestone announces development of non-pneumatic (airless) concept tire. Corporate news article. Bridgestone Corporation. Nov. 29, 2011 (retrieved on Jun. 13, 2013). Retrieved from the internet: URL: http://www.bridgestone.com/corporate/news/2011112901.html.

* cited by examiner

*Primary Examiner* — John Walters
*Assistant Examiner* — James Triggs
(74) *Attorney, Agent, or Firm* — John Steckler Schwab

(57) ABSTRACT

The present invention provides spoke geometry for a non-pneumatic tire that is less prone to fatigue when used. In particular, the spoke geometry is provided with an optimized thickness profile over the length of the spoke. This optimization results in a reduction in the peak strain energy density levels in the spoke, thereby reducing the likelihood of crack initiation and propagation which in turn enhances the durability of the spoke and tire.

16 Claims, 7 Drawing Sheets

SPOKE FOR A TIRE WITH OPTIMIZED THICKNESS FOR IMPROVED DURABILITY

PRIORITY CLAIM

This application claims the benefit of previously filed U.S. Provisional Patent Application entitled "Spoke for a Tire with Optimized Thickness for Improved Durability", assigned U.S. Ser. No. 61/620,687; filed on Apr. 5, 2012, and which is incorporated herein by reference in its entirety for all purposes.

BACKGROUND OF THE INVENTION

1. Field of the Invention

The present invention provides spoke geometry for a non-pneumatic tire that is less prone to fatigue when used. In particular, the spoke geometry is provided with an optimized thickness profile over the length of the spoke. This optimization results in a reduction in the peak strain energy density levels in the spoke, thereby reducing the likelihood of crack initiation and propagation which in turn enhances the durability of the spoke and tire.

2. Description of the Related Art

Non-pneumatic or structurally supported tires have been disclosed in the art. For example, U.S. Pat. No. 7,201,194, commonly owned by the applicant of the present invention, relates to a structurally supported resilient tire that supports a load without internal air pressure. The content of this patent is hereby incorporated by reference in its entirety. In an exemplary embodiment, this non-pneumatic tire includes an outer annular shear band and a plurality of web spokes that extend transversely across and radially inward from the annular band and are anchored in a wheel or hub. In certain exemplary embodiments, the annular shear band may further comprise a shear layer, at least a first membrane adhered to the radially inward extent of the shear layer and at least a second membrane adhered to the radially outward extent of the shear layer. In addition to the ability to operate without a required inflation pressure, the invention of U.S. Pat. No. 7,201,194 also provides advantages that include a more uniform ground contact pressure throughout the length of the contact area. Hence, this tire mimics the performance of a pneumatic tire.

FIG. 1 shows such a tire, defining a radial direction R and transverse direction T (which is perpendicular to the radial direction and perpendicular to the direction in which the tire rolls). For reference, all the reference numerals in the 100's used herein refer to a previous tire and spoke design while all reference numerals in the 200's used herein refer to a new and improved tire and spoke design according to an embodiment of the present invention. The tire 100, 200 comprises a tread 102, 202 that is attached to the outward extent 104, 204 of the spokes 106, 206, which in turn, are connected to a hub or wheel 108, 208 at their inward extent 110, 210 by means known in the art. For the version of the tire 100, 200 shown, the spokes 106, 206 are formed by pouring a polyurethane liquid into a mold, such as a rotational mold, where the liquid is then cured or hardened. It can also be seen that the spokes 106, 206 are grouped in pairs and that the individual spokes 106', 106", 206', 206" within each pair are consistently spaced from each other and that each pair is spaced consistently from the adjacent pair around the circumference of the tire. The spacing within each pair and the spacing between each adjacent pair do not need to be the same.

As described by the Abstract and col. 2, lines 28-41 of the '194 patent, the spokes 106, 206 support the tire 100, 200 in tension near the top of the tire 100, 200 and not in compression. Instead, the spokes 106, 206 at the bottom of the tire near the contact patch, which is where the tread 102, 202 of the tire contacts the road, compress or buckle easily. This helps the tire to simulate the pneumatic support function of a pneumatic tire. As can be imagined, these spokes 106, 206 undergo a great deal of cyclic stress from tension to compression especially as the tire 100, 200 rotates at high speeds. This creates a risk of fatigue failure for the spokes. Consequently, the endurance of the spokes 106, 206 and the operability of the tire 100, 200 depend significantly on the geometry with which the spokes 106, 206 are made.

Looking now at FIG. 2 a side sectional view of a previous spoke design that is susceptible to fatigue failure caused by crack initiation and propagation is shown. For the sake of clarity, only the spokes are shown. The thickness of the spoke, $T_{106}$, is relatively consistent at 2.8 mm, and the ends 112', 112" of the spokes 106', 106" where the spokes connect to the hub and tread are about 1 mm thicker at 3.8 mm. Hence, there is a transition area at either end of the spoke where the thickness of the spoke tapers down so that at roughly 25% of the radial height $H_r$ of the spoke from either end, the spoke is at the ultimate reduced thickness of 2.8 mm.

Testing of this spoke design has revealed that the fatigue limits of the spoke limits the load capacity of the tire. If the load is too great, then the tire a tendency over time to develop cracks that eventually propagate as the spoke 106 cycles between tension and compression as the tire 100 rolls on a road surface. Accordingly, there is a need for an improved spoke design that reduces the likelihood that crack initiation and propagation will occur at higher load limits. Also, such a design that can be easily molded and that does not degrade other tire performances would be particularly beneficial.

SUMMARY OF THE INVENTION

A tire according to an aspect of the present invention defines radial and transverse directions and further comprises a tread and a spoke having body geometry comprising a thickness that varies along the length of the spoke along the general radial direction that starts at one value, that gradually reduces to a second value, that then gradually increases to a third value, that then reduces to fourth value and that increases again to a fifth value.

In some cases, the first, third and fifth values of the thickness of the spoke are substantially the same. When this is the case, the second and fourth values of the thickness of the spoke may also be the same. In such a case, the second and fourth values of the thickness may be 60% the value of the first, third and fifth values. In a particular embodiment when the tire is a 205/55N16 sized tire, the first, third and fifth values of the thickness of the spoke is approximately 3.4 mm while the second and fourth values of the thickness of the spoke is approximately 2.0 mm. In such a case, the radial height of the spokes may be approximately 76 mm. Also the spoke may have an offset or deviation of the spoke from a perfectly straight path between the two ends of the spoke and said offset may be 25% or less of the radial height, and preferably may be around 15% of the radial height. The spoke of such a tire may be able to elastically deform when subjected to a deflection of 15 mm toward the center of the tire.

In some cases when the thickness of the spoke increases and decreases twice along the length of the spoke, the spoke may comprise four zones or regions and may have a centerline along the length of the spoke wherein said centerline has two inflection points and a midpoint found between said inflection points along the centerline. The first value of the thickness of the spoke may be found at one end of the spoke while the fifth value of the thickness of the spoke may be found at the other end of the spoke. In such a case, the first zone may be a transition region between said first end and a first inflection point where the thickness reduces to the second value, the second zone may be a transition region between said first inflection point and said midpoint where the thickness increases to the third value, the third zone may be a transition region between the midpoint and the second inflection point where the thickness increases to the fourth value, and the fourth zone may a transition region between the second inflection point and the other end of the spoke where the thickness increases to the fifth value.

Again in such a case, the second and fourth values of the thickness may be 60% the value of the first, third and fifth values. In a particular embodiment when the tire is a 205/55N16 sized tire, the first, third and fifth values of the thickness of the spoke is approximately 3.4 mm while the second and fourth values of the thickness of the spoke is approximately 2.0 mm. In such a case, the radial height of the spokes may be approximately 76 mm. Also the spoke may have an offset or deviation of the spoke from a perfectly straight path along the radial direction and said offset may be 25% or less of the radial height, and preferably may be around 15% of the radial height. The spoke of such a tire may be able to elastically deform when subjected to a deflection of 15 mm toward the center of the tire.

In any of the above embodiments, the centerline may be constructed of a series of analytical curves such as lines and arcs and the boundaries of the spoke on either side of the centerline may also be constructed of a series of analytical curves such as lines and arcs. Also, any of the above embodiments could have spokes made from polyurethane such as that sold under the trade name VIBRATHANE B836. In some cases, the tire comprises a series of spokes that are paired having identical spoke geometries that repeat around the circumference of the tire.

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended FIGS., in which.

DETAILED DESCRIPTION OF PARTICULAR EMBODIMENTS

Reference will now be made in detail to embodiments of the invention, one or more examples of which are illustrated in the FIGS. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. It should be noted that for the purposes of discussion, only a portion of the exemplary tire embodiments may be depicted in one or more of the FIGS. Reference numbers are used in the FIGS. solely to aid the reader in identifying the various elements and are not intended to introduce any limiting distinctions among the embodiments. Common or similar numbering for one embodiment indicates a similar element in the other embodiments.

Given the tendency of the previous geometry to fail at times due to fatigue attributable to crack initiation and propagation, the inventors of the present invention proceeded to theorize how to improve the geometry so that this phenomenon occurs less frequently. Experience demonstrated that a design that has a reduced peak strain energy density would have a corresponding reduction in crack initiation and propagation. Accordingly, they used an iterative process to determine what geometry could affectively lower the peak strain energy density and what is described below is what they have found to be an effective solution as supported by FEA results. As described below, this design lowers peak strain energy density by approximately 40%, which based on empirical data, should result in about a 200% improvement in the fatigue life of the spoke. As will also be further detailed below, this amount of improvement and the geometry that produces such an improvement at the same mass and stiffness of the spoke without degrading other tire performances is an unexpected result.

Figure 3:
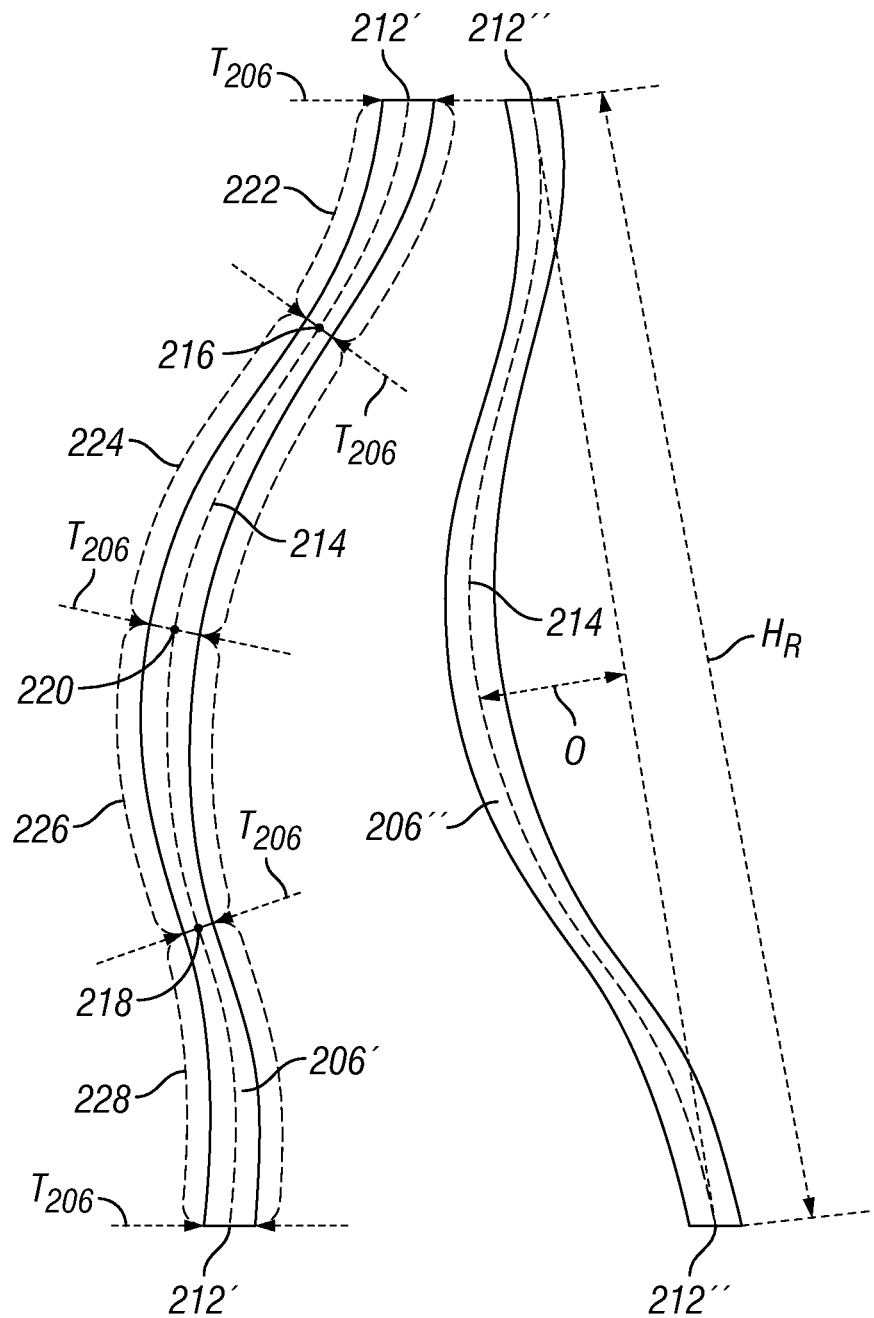
FIG. 3 is a side sectional view of a pair of spokes of a first embodiment of the present invention with the tread removed for clarity taken along the midplane of the tire, which is the plane that is parallel to the radial direction of the tire and is coincident with the midpoint of the tire in the transverse direction of the tire.

Turning now to FIG. 3 a side sectional view of the spokes according to one embodiment of the present invention can be seen. For the sake of clarity, the spokes are removed from the rest of the structure. Looking at the cross-sectional shape of spokes 206', 206", it should be noted that the thickness of the body of the spoke, $T_{206}$, varies throughout the length of the spoke along the radial direction of the tire between the ends 212', 212" of the spokes 206', 206". Also, the shape of the spoke is such that it has centerline 214 with two inflection points 216, 218 about which the curvature of the spoke changes direction and a midpoint 220 that is found between the two inflection points. Also, there is a radial height $H_r$ which is the straight distance in the radial direction along which the centerline of the spoke could extend but does not due to the inflection points.

Furthermore, there is an offset O or deviation that the centerline of the of the spoke makes from $H_r$ that can be measured in a direction that is perpendicular from $H_r$ to the centerline 214 and for these particular spokes this offset reaches its maximum at the midpoint 220. Also, the inflection points are located at a distance that is roughly equal to 25% of the value $H_r$ from either end of the spoke. For this embodiment, the thickness at one end 212' of the spoke gradually decreases until it reaches a minimum at the first inflection point 216. The section of the spoke between the first end 212' and the first inflection point 216 can be referred to as zone one 222. The spoke then increases in thickness until it reaches the midpoint 220 where it reaches a maximum. This region between the first inflection point 216 and the midpoint 220 can be called zone two 224. The spoke then begins to decrease in thickness until it reaches the second inflection point 218 where it reaches another minimum. The region between the midpoint 220 and the second inflection point 218 may be referred to as zone three 226. Finally, the spoke begins to grow thicker until it reaches the other end 212' of the spoke where it reaches another maximum. The region between the second inflection point 218 and the other end of the spoke 212' may be called zone four 228.

Figure 1:
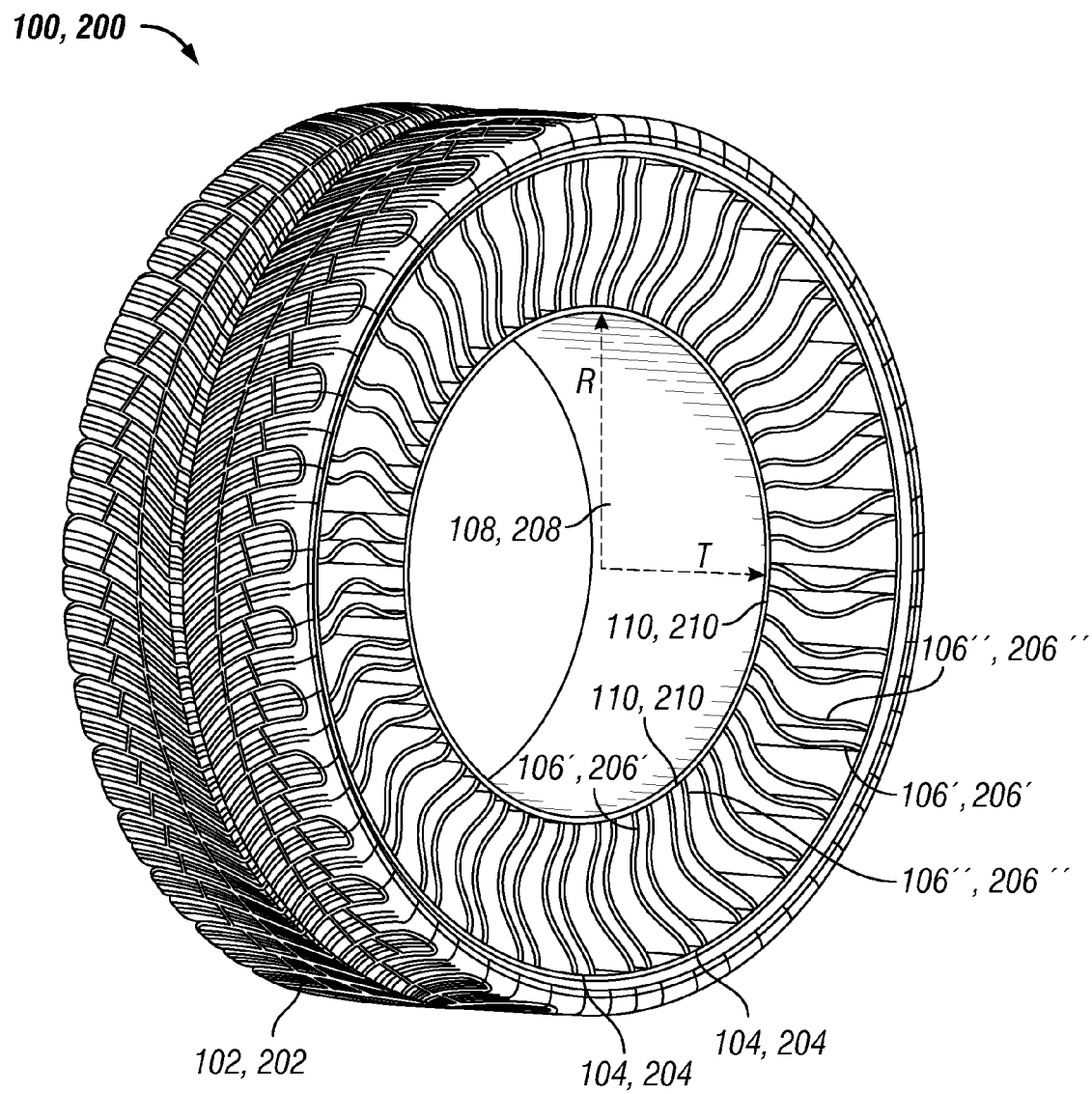
FIG. 1 is a perspective view of a non-pneumatic tire that has spokes.
Figure 2:
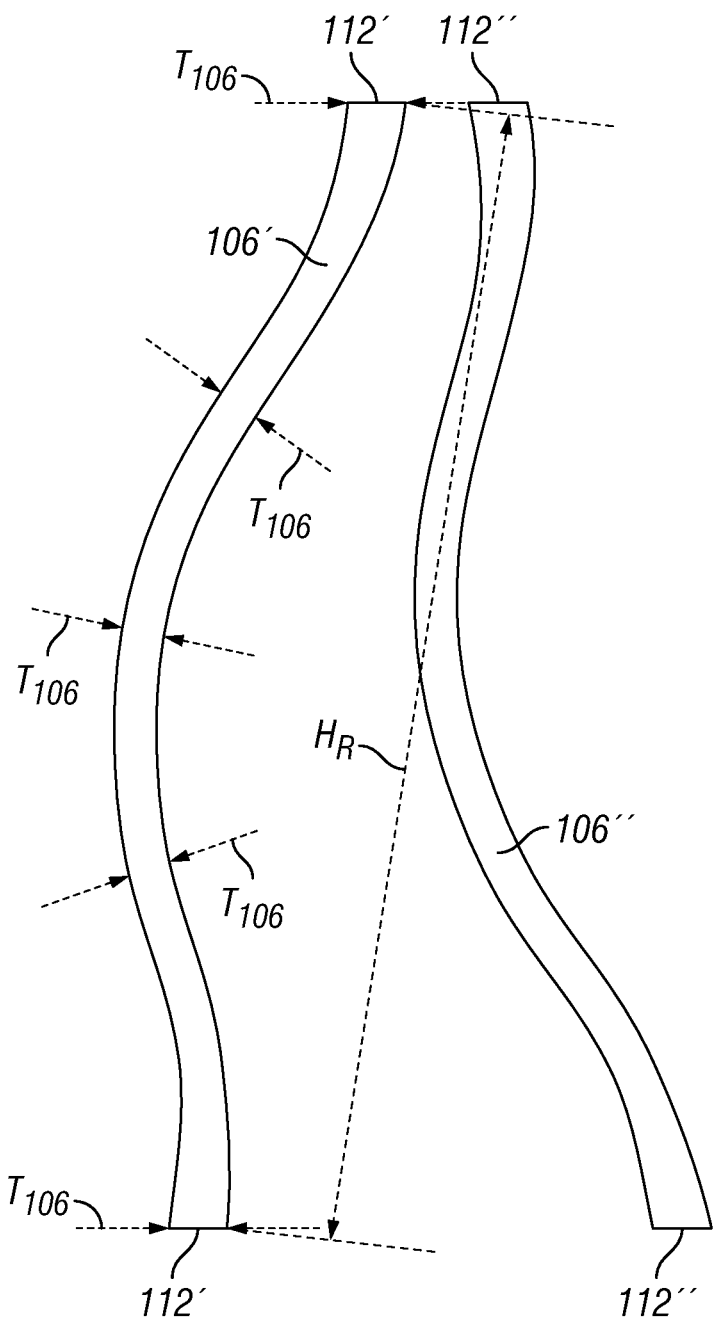
FIG. 2 is a side sectional view of a pair of spokes of a first configuration that have been used previously in a non-pneumatic tire with the tread and shear ring removed for clarity taken along the midplane of the tire, which is the plane that is parallel to the radial direction of the tire and is coincident with the midpoint of the tire in the transverse direction of the tire.

For this embodiment, the tire was a 205/55N16 sized tire, which means that the depth of the spokes in the transverse direction of the tire is about 205 mm near the tread and 155 mm near the hub due to the concave profile of the front and back extremities of the spokes (as best seen in FIG. 1). The thickness of the spoke ends 212' and the midpoint 220, are all approximately the same amount at about 3.4 mm while the thickness of the spoke at the inflection points are roughly the same at about 2.0 mm. This means that the ratio of the thinnest areas of the spokes to the thickest is approximately 60%. These spokes were designed to elastically deform when deflected by 15 mm in the radial direction toward the center of the tire. Radial Height $H_r$ of the spokes for this tire is approximately 76 mm and the offset O is approximately 12 mm. Hence for this tire the ratio of 0 to $H_r$ is about 15% but it is contemplated that this could be larger such as 25% or less such as 0% in cases where the spoke is completely straight.

Furthermore, it is contemplated that relative thicknesses of the ends of the spokes and the middle portion of the spoke can be varied as well as the thickness of the spoke at the inflection points so long as the spoke continues to increase and decrease in thickness along the length of the centerline of the spoke. For example, the thickness of the first end of the spoke could be 3.4 mm, the thickness of the spoke at the first inflection point could be 2.4 mm, the thickness of the spoke at the midpoint could be 3.0 mm, the thickness of the spoke at the second inflection point could be 1.5 mm, and the thickness of the spoke at the other end could be 3.6 mm. Also, the curves that define the geometry of the spokes could be of any nature. However, for this particular embodiment the types of curves used as the centerline and inner and outer boundaries of the spokes were all analytical curves, such as lines and arcs, to ease in manufacturing and in inspection of the geometry. Also, there are practical limits to the geometry in order to enable mold manufacture and fill so the minimum thickness should not be so small to make these tasks difficult.

The spokes may be manufactured using any material that is suitable for processing and for providing the physical properties needed for the spokes to function. For example, any suitable thermosetting material may be used such as polyurethane. In particular, polyurethane sold under the trade name VIBRATHANE B836 could be used. Also, the space between various spokes and the geometry that one spoke has may differ from the geometry of another spoke.

Figure 4A:
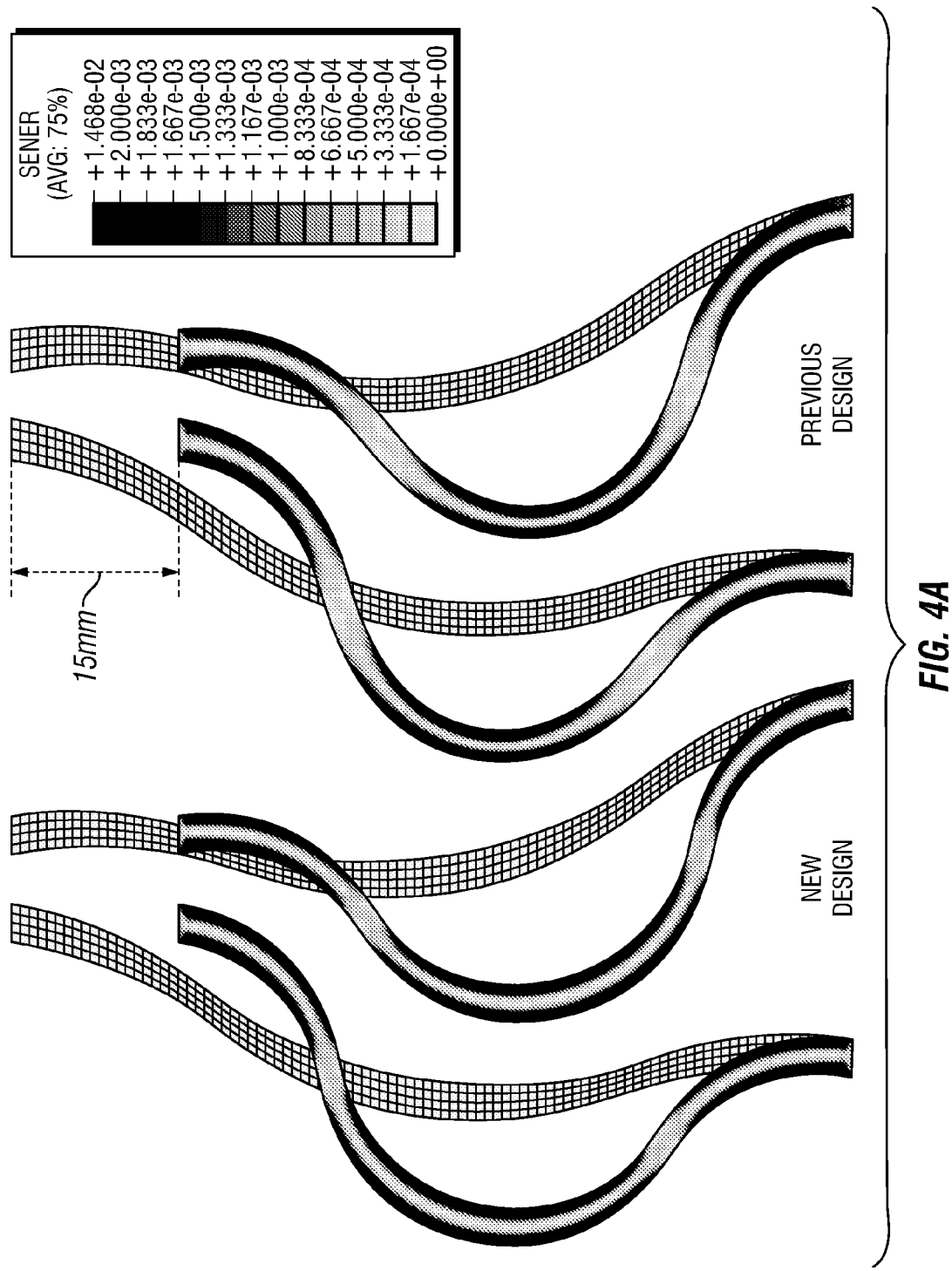
FIG. 4A is a plot of FEA results for a previous spoke design and a spoke design according to an embodiment of the present invention in both deflected and non-deflected states, showing the peak strain energy density associated with both designs at a deflection of 15 mm.
Figure 4B:
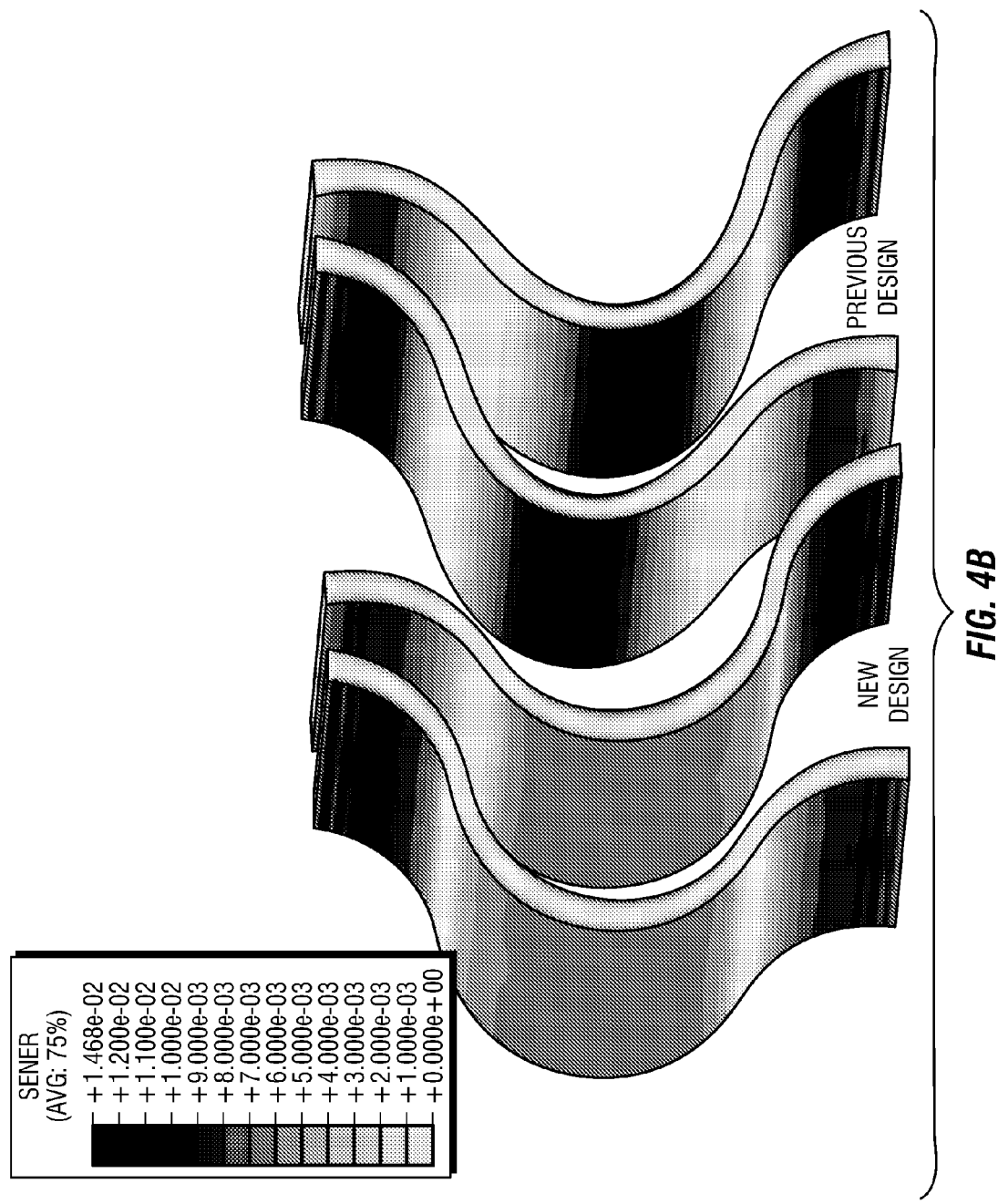
FIG. 4B is a plot of the FEA results of FIG. 4A shown at an angle from the transverse directions so that the peak stresses found near the middle of the spokes can be more clearly seen.
Figure 4C:
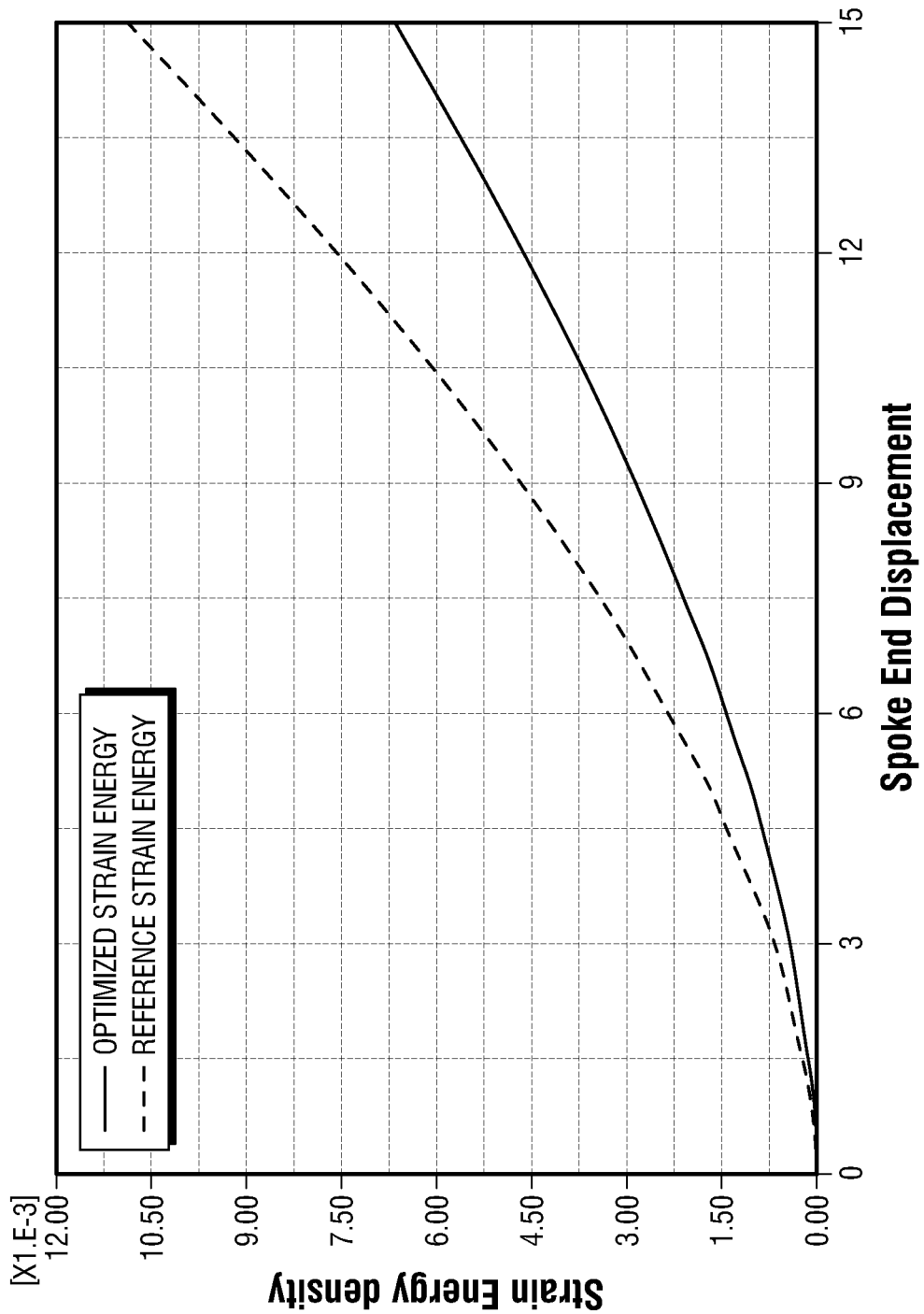
FIG. 4C is a graph of the peak strain energy density associated with a spoke of the previous design with the design of an embodiment of the present invention, plotted according to the data found in Table 1.

Looking at FIG. 4A, we see non-deflected meshes or models, made and analyzed in ABAQUS, of the previous and new designs along with deflected plots of these models showing their associated peak strain energy densities. Note that the peak strain energy at a 15 mm deflection of the old design was about $1.09 \times 10^{-2}$ (daN-mm/mm$^3$) while the peak strain energy at a 15 mm deflection of the design according to an embodiment of the present invention was about $6.7 \times 10^{-3}$ (daN-mm/mm$^3$) as best seen in FIG. 4B where these associated peak strain energy densities are found in the locations denoted by the letters "A" in the plot. By way of further illustration, the values of strain energy density versus deflection or displacement at locations "A" that have been calculated using FEA for both designs is contained in Table 1 immediately below and is shown graphically in FIG. 4C.

TABLE 1

| X Displacement | Optimized Strain Energy for New Design (daN-mm/mm$^3$) | Ref. Strain Energy for Previous Design (daN-mm/mm$^3$) |
| --- | --- | --- |
| 0 mm | 0 | 0 |
| 1 mm | 52.1428E−06 | 82.4362E−06 |
| 3 mm | 415.919E−06 | 667.641E−06 |
| 5 mm | 1.04251E−03 | 1.68771E−03 |
| 7 mm | 1.87188E−03 | 3.04529E−03 |
| 9 mm | 2.86881E−03 | 4.67997E−03 |
| 11 mm | 4.01119E−03 | 6.55209E−03 |
| 13 mm | 5.28455E−03 | 8.63442E−03 |
| 15 mm | 6.67912E−03 | 10.9076E−03 |

Unexpectedly, increasing the thickness near the middle of the spoke where the peak strain energy density was the highest has actually lowered the peak strain energy more than 40%. This is truly unexpected as the equation relating strain to thickness of a beam that is well known in the art is $\epsilon = t/(2*\rho)$ where $\epsilon$ is strain, t is the thickness of the beam and $\rho$ is the radius of curvature of the beam. One with ordinary skill in the art would not expect that increasing the thickness of the beam would actually decrease the strain as this equation indicates that strain linearly increases with increasing thickness. The inventors have discovered that the radius of curvature of the beam is actually a function of the thickness of the beam so that while increasing the thickness does tend to increase strain in one way, it also serves to increase the radius of curvature in a greater way, which actually results in an overall lower strain.

Figure 4D:
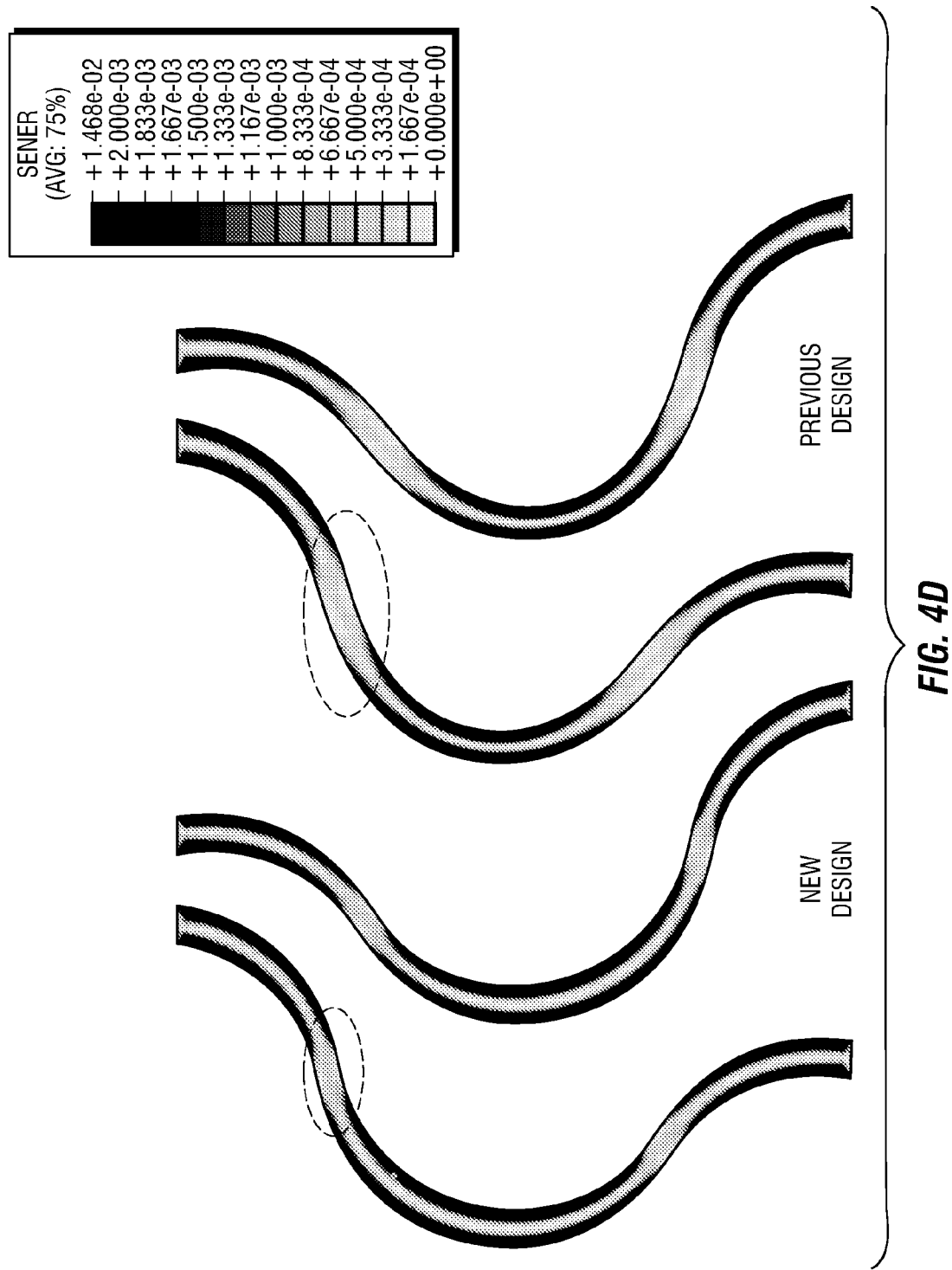
FIG. 4D is a graph showing the more efficient use of material of the design according to an embodiment of the present invention as compared to the previous spoke design.

This phenomenon can be seen by looking at FIG. 4D. By thinning out the areas near the inflection points, these points act more like hinges so that the areas of the spoke near the midpoint actually flex less, resulting in less peak strain energy density during deformation. Also, increasing the thickness of the center of the spoke allows it to flex less and the areas near the inflection points to flex more, also contributing to the reduction of peak strain energy. So, by changing the location of rather than the amount of the mass in the spoke, an improvement in peak strain energy density is achieved. In other words, the use of the material in the spoke has become more efficient. Also, the same stiffness can be achieved allowing the load versus deflection of the spoke to remain relatively the same, thereby preserving the other performances of the spoke and tire. Alternatively, it is contemplated by the inventors that this gain in reduction in peak strain energy density and increase in the fatigue life of the spoke could be traded in for a shorter radial height of the spokes, which could result in reduced mass meaning lower rolling resistance and increased brake clearance.

It should be noted that the present invention also includes other spoke geometries not disclosed herein. For example, it is possible that the spoke can be attached by other structures near the tread and hub other than what has been described herein. In other words, any spoke design that has a section of geometry along its centerline along the general radial direction of the tire that contracts in thickness and expands in thickness at least twice between the hub and tread is an embodiment of the present invention. It should be noted that this profile was taken at the midplane of the tire, which is parallel to the circumferential direction of the tire or direction that the tire rolls and the radial direction, and that this preferred profile could vary in the transverse direction as long as the majority of the spoke has a profile that follows the geometry described herein. For example, it is contemplated that the forward and rearward extremities of the spokes in the transverse direction could have chamfered or radiused ends so that the cross-section is reduced and still be within the scope of the present invention.

Also, the presence of inflection points is not necessary to practice the present invention as even straight spokes will have a tendency to form inflection points as it buckles. Furthermore, the presence of three or more inflection points is also considered to be within the scope of the present invention provided it can provide enough flexibility for the necessary deflection when the spoke is in or near the contact patch while also not being too long to provide the needed load bearing capability in tension when the spokes are near the top of the tire opposite radially from the contact patch. Also, the location of any inflection points as may be varied as desired and the location of the maximum offset does not necessarily need to occur at midpoint of the spoke. Also, this technique can be applied to tires of different sizes and that require differing deflections.

In conclusion, it should be understood that the present invention includes various other modifications that can be made to the exemplary embodiments described herein that come within the scope of the narration of the claims and their equivalents in the Summary of Exemplary embodiments. For example, the specific examples given have involved the use of polyurethane but it is contemplated that other thermosetting or thermoplastic materials could be used. In addition, the mold discussed herein was a rotational mold but other molding or casting technologies could be used such as injection molding. These and other embodiments are within the spirit and scope of the present invention.

What is claimed is:

1. A tire that defines radial and transverse directions and comprises a tread and a spoke having body geometry including a thickness that varies along the length of the spoke along the general radial direction that starts at one value, that gradually reduces to a second value, that then gradually increases to a third value, that then reduces to a fourth value and that then increases again to a fifth value wherein the length of said spoke follows a path and said path is offset from perfectly straight path from a first end of said spoke a second end of said spoke.

2. A tire according to claim 1 wherein the first, third and fifth values of the thickness of the spoke are substantially the same.

3. A tire according to claim 2 wherein the second and fourth values of the thickness of the spoke are substantially the same.

4. A tire according to claim 3 wherein the second and fourth values of the thickness of the spoke are approximately 60% the value of the first, third and fifth values.

5. A tire according to claim 4 wherein the tire is a 205/55N16 sized tire, the first, third and fifth values of the thickness of the spoke is approximately 3.4 mm while the second and fourth values of the thickness of the spoke is approximately 2.0 mm and the tire comprises a plurality of similarly configured spokes.

6. A tire according to claim 5 wherein the radial height of the spoke is approximately 76 mm.

7. A tire according to claim 6 wherein the spoke has an offset or deviation of its path between the two ends of the spoke wherein the offset is 25% or less of the radial height of the spoke, and is preferably around 15% of the radial height of the spoke.

8. A tire according to claim 7 wherein the spoke is configured to elastically deform when subjected to a deflection of 15 mm toward the center of the tire along its radial direction.

9. A tire that defines radial and transverse directions and comprises a tread and a spoke having body geometry including a thickness that varies along the length of the spoke along the general radial direction that starts at one value, that gradually reduces to a second value, that then gradually increases to a third value, that then reduces to a fourth value and that then increases again to a fifth value wherein the thickness of the spoke increases and decreases twice along the length of the spoke and the spoke comprises four zones or regions and has a centerline along the length of the spoke and wherein said centerline has two inflection points and a midpoint found between said inflection points along the centerline.

10. A tire according to claim 9 wherein the first value of the thickness of the spoke may be found at one end of the spoke and the fifth value of the thickness of the spoke may be found at the other end of the spoke and wherein the first zone is a transition region between said first end and a first inflection point where the thickness reduces to the second value, the second zone is a transition region between the first inflection point and the midpoint where the thickness increases to a third value, the third zone is a transition region between the midpoint and the second inflection point where the thickness increases to the fourth value, and the fourth zone is a transition region between the second inflection point and the other end of the spoke where the thickness increases to the fifth value.

11. A tire according to claim 10 wherein the second and fourth values of the thickness is approximately 60% of the value of the first, third and fifth values.

12. A tire according to claim 11 wherein the tire is a 205/55N16 sized tire and the first, third and fifth values of the spoke is approximately 3.4 mm and the second and fourth values of the thickness of the spoke is approximately 2.0 mm and the tire comprises a plurality of similarly configured spokes.

13. A tire according to claim 12 wherein the spoke has a radial height of approximately 76 mm.

14. A tire according to claim 13 wherein the spoke has an offset or deviation of the spoke from a perfectly straight path along the radial direction and said offset is 25% or less of the radial height of the spoke, and is preferably around 15% of the radial height of the spoke.

15. A tire according to claim 14 wherein the spoke is configured to elastically deform when subjected to a deflection of 15 mm toward the center of the tire along the radial direction of the tire.

16. A tire according to claim 9 wherein the centerline is constructed from a series of analytical curves such as lines and arcs and the spoke further comprises boundary curves that are also constructed from analytical curves such as lines and arcs.

* * * * *